(12) United States Patent
Tomescu (10) Patent No.: US 10,829,201 B2
(45) Date of Patent: Nov. 10, 2020

(54) BLADE ANGLE POSITION FEEDBACK SYSTEM WITH EXTENDED MARKERS

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 85 days.

(21) Appl. No.: 16/359,276

(22) Filed: Mar. 20, 2019

(65) Prior Publication Data

US 2020/0299003 A1    Sep. 24, 2020

(51) Int. Cl.
```
B64C 11/30      (2006.01)
B64C 27/78      (2006.01)
B64C 11/46      (2006.01)
```
(52) U.S. Cl.
CPC .......... B64C 11/301 (2013.01); B64C 11/30 (2013.01); B64C 27/78 (2013.01); B64C 11/46 (2013.01)

(58) Field of Classification Search
CPC ....... B64C 11/301; B64C 11/30; B64C 27/78; B64C 11/46
See application file for complete search history.

(56) References Cited

U.S. PATENT DOCUMENTS

| | | | | |
|---|---|---|---|---|
| 2,069,991 A * | 2/1937 | Blanchard | ............ | B64C 11/301 310/37 |
| 3,626,226 A * | 12/1971 | Pauwels | ............ | G01P 3/488 310/168 |
| 3,710,623 A * | 1/1973 | Boyd | ............ | G01F 1/115 73/861.78 |
| 3,937,994 A * | 2/1976 | Presley | ............ | G01P 3/488 310/168 |
| 3,947,711 A * | 3/1976 | Presley | ............ | B60T 8/329 310/155 |
| 4,061,007 A * | 12/1977 | Hansen | ............ | B21D 1/06 72/56 |
| RE29,509 E * | 1/1978 | Pauwels | ............ | G01P 3/443 310/168 |

(Continued)

FOREIGN PATENT DOCUMENTS

| DE | 19533385 A1 * | 3/1997 | .......... G01D 5/2013 |
|---|---|---|---|
| EP | 0353076 | 1/1990 | |

(Continued)

OTHER PUBLICATIONS

4 Types of Electric Times and Light Controls (Nov. 21, 2018) (Year: 2018).*

*Primary Examiner* — Kenneth Bomberg
*Assistant Examiner* — Brian Christopher Delrue
(74) *Attorney, Agent, or Firm* — Norton Rose Fulbright Canada LLP (57) ABSTRACT

A blade angle feedback assembly for an aircraft-bladed rotor and an aircraft-bladed rotor system are provided. The rotor is rotatable about a longitudinal axis and has an adjustable blade pitch angle. A feedback device is coupled to rotate with the rotor, the feedback device having a root surface having an edge. At least one position marker extends from the root surface and extends laterally beyond the edge. At least one sensor is mounted adjacent the feedback device and configured to detect a passage of the at least one position marker as the feedback device rotates about the longitudinal axis.

16 Claims, 8 Drawing Sheets

(56) References Cited

U.S. PATENT DOCUMENTS

| | | | | |
|---|---|---|---|---|
| 4,181,206 A * | 1/1980 | Seilenbinder | A01D 34/6806 | 192/129 A |
| RE30,522 E * | 2/1981 | Gee | B60T 8/329 | 310/168 |
| RE31,199 E * | 4/1983 | Presley | G01P 3/488 | 310/155 |
| 4,647,892 A * | 3/1987 | Hewitt | G01P 1/026 | 310/155 |
| 4,795,278 A * | 1/1989 | Hayashi | B60B 27/0068 | 310/155 |
| 4,831,362 A * | 5/1989 | Tsaprazis | F16N 29/00 | 324/202 |
| 4,853,575 A * | 8/1989 | Lessig, III | G01P 3/487 | 310/171 |
| 4,901,015 A * | 2/1990 | Pospischil | G01P 3/488 | 324/174 |
| 4,934,825 A * | 6/1990 | Martin | B64C 11/50 | 416/34 |
| 4,934,901 A * | 6/1990 | Duchesneau | F01D 7/00 | 416/46 |
| 4,992,733 A * | 2/1991 | Griebeler | F15B 15/2846 | 324/207.21 |
| 4,996,888 A * | 3/1991 | Foran, Jr. | G01F 3/10 | 73/253 |
| 5,041,784 A * | 8/1991 | Griebeler | F15B 15/28 | 324/207.21 |
| 5,111,098 A * | 5/1992 | Peck | G01P 3/443 | 310/268 |
| 5,321,355 A | 6/1994 | Luetzow | | |
| 5,563,510 A * | 10/1996 | Gorrell | G01D 11/245 | 174/541 |
| 5,696,442 A * | 12/1997 | Foster | G01P 1/04 | 29/592.1 |
| 5,721,486 A | 2/1998 | Pape | | |
| 5,897,293 A * | 4/1999 | Arel | B64C 11/303 | 416/114 |
| 5,913,659 A | 6/1999 | Doolin et al. | | |
| 5,993,627 A * | 11/1999 | Anderson | G01N 27/44773 | 204/456 |
| 6,077,040 A | 6/2000 | Pruden et al. | | |
| 6,279,406 B1 * | 8/2001 | Li | G01R 33/02 | 73/861.08 |
| 6,392,405 B1 * | 5/2002 | Nishizaki | B21D 53/18 | 29/894 |
| 6,672,835 B1 * | 1/2004 | Hughes | B64C 11/301 | 416/155 |
| 6,809,516 B1 * | 10/2004 | Li | G01R 15/20 | 324/244 |
| 6,836,035 B1 * | 12/2004 | Pawletko | B60L 7/22 | 310/49.08 |
| 7,023,205 B1 * | 4/2006 | Krupp | G01N 27/72 | 324/239 |
| 7,148,679 B2 * | 12/2006 | Proctor | G01D 5/2013 | 324/207.14 |
| 7,166,996 B2 * | 1/2007 | Godkin | G01D 5/145 | 324/207.2 |
| 8,063,628 B2 * | 11/2011 | Finkler | G01D 5/147 | 324/207.24 |
| 8,258,780 B2 * | 9/2012 | Smith | G01P 3/487 | 324/207.25 |
| 8,549,833 B2 * | 10/2013 | Hyde | F02K 3/06 | 60/204 |
| 8,593,136 B2 * | 11/2013 | Franke | G01D 5/145 | 324/207.2 |
| 8,687,206 B2 | 4/2014 | Hockaday | | |
| 8,797,024 B2 * | 8/2014 | Ausserlechner | G01D 5/2451 | 324/207.14 |
| 8,823,367 B2 * | 9/2014 | Fukui | G01D 5/2449 | 324/207.25 |
| 8,884,611 B2 * | 11/2014 | Hunger | G01D 5/145 | 324/207.2 |
| 9,068,505 B1 * | 6/2015 | Chang | F01P 5/02 | |
| 9,821,901 B2 * | 11/2017 | Duke | B64D 45/00 | |
| 10,435,140 B2 * | 10/2019 | Marone | B64C 11/301 | |
| 10,486,827 B2 * | 11/2019 | Yakobov | B64C 11/301 | |
| 2001/0037776 A1 * | 11/2001 | Husges | F02B 75/16 | 123/41.65 |
| 2002/0011840 A1 * | 1/2002 | Li | G01D 5/147 | 324/207.21 |
| 2002/0125884 A1 * | 9/2002 | Wendt | F15B 15/2861 | 324/207.24 |
| 2004/0032253 A1 * | 2/2004 | Suzuki | G01D 5/145 | 324/207.24 |
| 2005/0017588 A1 * | 1/2005 | Yamaguchi | B60L 50/15 | 310/156.45 |
| 2006/0113990 A1 * | 6/2006 | Schodlbauer | G01D 5/145 | 324/207.24 |
| 2007/0110577 A1 * | 5/2007 | Danielson | B64C 11/305 | 416/1 |
| 2007/0114991 A1 * | 5/2007 | Tatenuma | G01D 5/00 | 324/207.25 |
| 2007/0182405 A1 * | 8/2007 | Yokotani | G01R 33/072 | 324/207.25 |
| 2008/0317397 A1 * | 12/2008 | Muranaka | F16C 41/007 | 384/448 |
| 2009/0007770 A1 * | 1/2009 | Kriegsmann | F15B 15/1428 | 91/55 |
| 2009/0261531 A1 * | 10/2009 | Deshpande | H02K 49/106 | 277/629 |
| 2010/0274447 A1 * | 10/2010 | Stumpf | G01D 18/00 | 701/36 |
| 2010/0286791 A1 * | 11/2010 | Goldsmith | A61B 17/0057 | 623/23.7 |
| 2011/0227565 A1 * | 9/2011 | Morton | G01N 3/56 | 324/225 |
| 2012/0186386 A1 * | 7/2012 | McCombs | F16D 13/72 | 74/572.21 |
| 2012/0215389 A1 * | 8/2012 | Perry | H02K 21/24 | 701/22 |
| 2012/0262159 A1 * | 10/2012 | Pellin | F15B 15/2861 | 324/207.24 |
| 2012/0285266 A1 | 11/2012 | Takahashi et al. | | |
| 2013/0049743 A1 * | 2/2013 | Sawano | G01F 1/24 | 324/207.24 |
| 2013/0174533 A1 * | 7/2013 | Ribarov | B64C 11/48 | 60/226.1 |
| 2013/0304418 A1 * | 11/2013 | Gendrich | F01D 17/20 | 702/182 |
| 2014/0007591 A1 | 1/2014 | Khibnik et al. | | |
| 2014/0163664 A1 * | 6/2014 | Goldsmith | A61B 17/12181 | 623/1.11 |
| 2014/0191624 A1 * | 7/2014 | Jahshan | H02P 6/14 | 310/68 B |
| 2015/0139798 A1 * | 5/2015 | Duke | B64C 11/301 | 416/1 |
| 2015/0222151 A1 * | 8/2015 | Semken | F28D 7/055 | 310/216.008 |
| 2015/0233742 A1 * | 8/2015 | Vokinger | G01D 5/2449 | 324/207.24 |
| 2016/0003640 A1 * | 1/2016 | Aki | G01D 5/14 | 324/207.24 |
| 2016/0138983 A1 | 5/2016 | Ikeda | | |
| 2018/0050789 A1 * | 2/2018 | Marone | B64C 11/301 | |
| 2018/0050816 A1 * | 2/2018 | Yakobov | B64C 11/301 | |
| 2018/0198332 A1 * | 7/2018 | Ueda | H02K 19/10 | |
| 2018/0304991 A1 * | 10/2018 | Kudrna | G01P 3/488 | |
| 2018/0306053 A1 * | 10/2018 | Chapman | B64C 11/301 | |
| 2019/0247050 A1 * | 8/2019 | Goldsmith | A61B 17/00491 | |
| 2020/0001978 A1 * | 1/2020 | Yakobov | B64C 11/301 | |
| 2020/0003074 A1 * | 1/2020 | Yakobov | F01D 21/003 | |
| 2020/0017195 A1 * | 1/2020 | Marone | B64C 11/301 | |
| 2020/0017234 A1 * | 1/2020 | Marone | B64C 11/301 | |
| 2020/0080688 A1 * | 3/2020 | Weiler | F16P 3/147 | |

(56) References Cited

U.S. PATENT DOCUMENTS

2020/0110350 A1\* 4/2020 Hayashi ............. G03G 15/0921
2020/0182899 A1\* 6/2020 Fricke ..................... G01P 3/488

FOREIGN PATENT DOCUMENTS

| EP | 2400307 A1 \* | 12/2011 | ............... G01P 1/026 |
| EP | 2876046 A1 \* | 5/2015 | ............. G01P 3/488 |
| EP | 3284665 A1 \* | 2/2018 | ............. B64C 11/50 |
| EP | 3284666 A1 \* | 2/2018 | ............. B64C 11/50 |
| EP | 3587744 A1 \* | 1/2020 | ............. G01L 3/101 |
| EP | 3597532 A1 \* | 1/2020 | ............. B64D 45/02 |
| WO | WO-9007126 A1 \* | 6/1990 | ......... G01R 27/2611 |
| WO | WO-2006008044 A1 \* | 1/2006 | ............. B60T 8/329 |

\* cited by examiner

BLADE ANGLE POSITION FEEDBACK SYSTEM WITH EXTENDED MARKERS

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. The feedback device has multiple readable raised markers disposed on an outer surface thereof, and a sensor can be used to measure the rotation of the feedback device via the markers, providing a proxy value for the rotational velocity of the engine, as well as measure blade angle. Existing feedback devices are however vulnerable to a so-called "edge-effect" that leads to an increase in reading error as the sensor approaches the edges of the feedback device.

Therefore, improvements are needed.

SUMMARY

In accordance with a broad aspect, there is provided a blade angle feedback assembly for an aircraft-bladed rotor, the rotor rotatable about a longitudinal axis and having an adjustable blade pitch angle. The assembly comprises a feedback device coupled to rotate with the rotor, the feedback device having a root surface having an edge, at least one position marker extending from the root surface and extending laterally beyond the edge, and at least one sensor mounted adjacent the feedback device and configured to detect a passage of the at least one position marker as the feedback device rotates about the longitudinal axis.

In accordance with another broad aspect, there is provided an aircraft-bladed rotor system, comprising a rotor rotatable by a shaft about a longitudinal axis, the rotor having blades with adjustable blade pitch angle, and a feedback device coupled to rotate with the rotor, the feedback device having a root surface having an edge, at least one position marker extending from the root surface and extending laterally beyond the edge.

In some embodiments, the root surface has a first edge and a second edge opposite the first edge, and the at least one position marker extends axially from a first end to a second end, at least one of the first end and the second end extending laterally beyond a corresponding at least one of the first edge and the second edge.

In some embodiments, the at least one sensor is configured to detect, as the feedback device rotates about the longitudinal axis, a change in magnetic flux caused by passage of the at least one position marker in a sensing zone of the at least one sensor, the at least one of the first end and the second end extending laterally beyond the at least one of the first edge and the second edge resulting in an increase in a density of the magnetic flux as the feedback device is displaced along the longitudinal axis.

In some embodiments, the at least one sensor is mounted adjacent the feedback device between the first edge and the second edge, the first end of the at least one position marker extending laterally beyond the first edge and the second end of the at least one position marker extending laterally beyond the second edge.

In some embodiments, the at least one sensor is mounted adjacent a given one of the first edge and the second edge, the at least one position marker extending laterally beyond the other one of the first edge and the second edge.

In some embodiments, the feedback device comprises at least one support member configured to extend away from the at least one of the first edge and the second edge and to support the at least one of the first end and the second end thereon.

In some embodiments, the at least one of the first end and the second end is substantially parallel to the corresponding at least one of the first edge and the second edge.

In some embodiments, the at least one position marker comprises a first plurality of projections extending from the root surface and oriented substantially parallel to the longitudinal axis and at least one second projection extending from the root surface and positioned between two adjacent first projections, the first plurality of projections circumferentially spaced from one another and the at least one second projection disposed on the root surface at an angle relative to the first plurality of projections, and further wherein the first plurality of projections and the at least one second projection extend laterally beyond the at least one of the first edge and the second edge.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
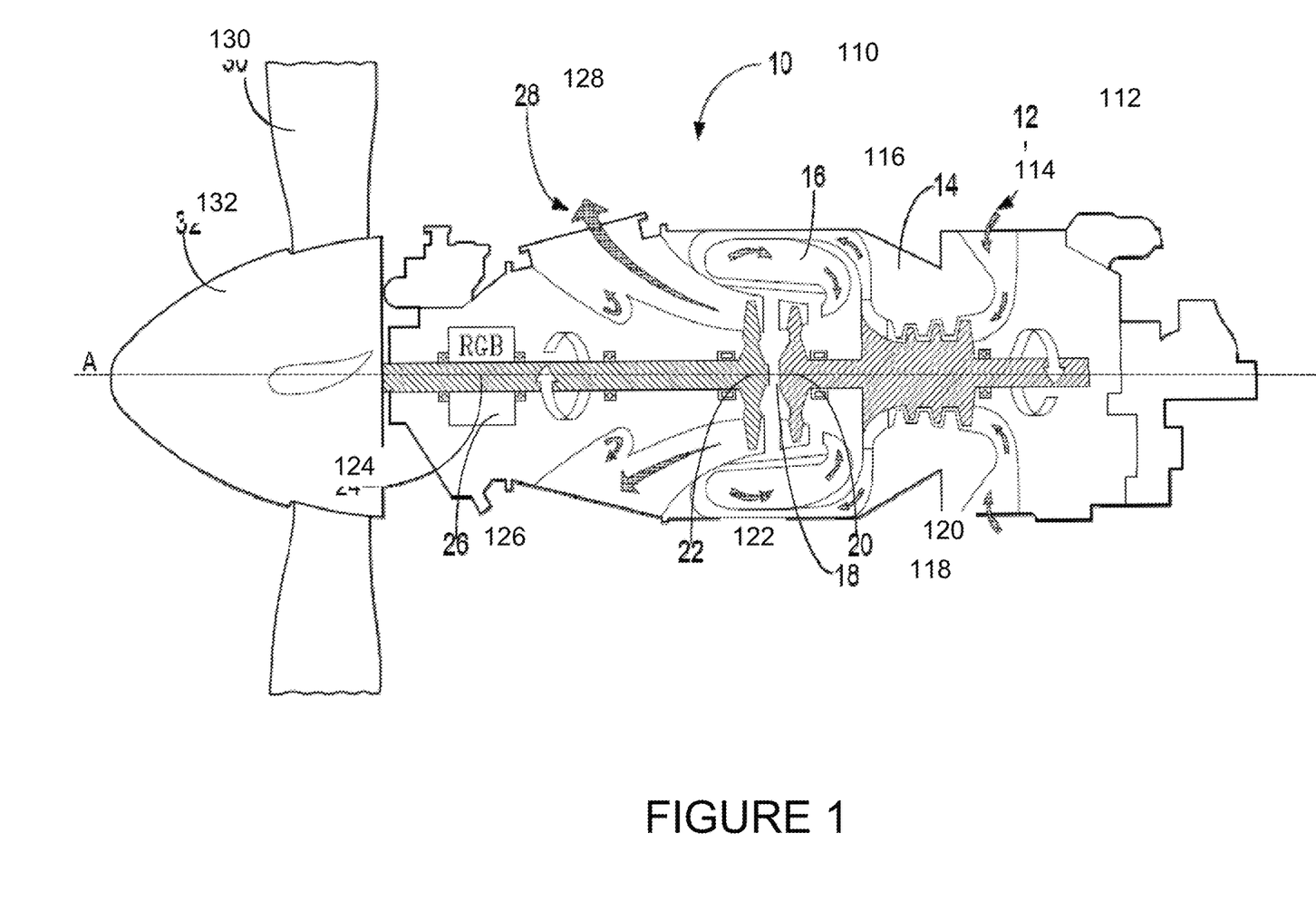
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Rotation of the output shaft 124 is facilitated by one or more bearing assemblies (not illustrated), which can be disposed within the RGB 126 or at any other suitable location. The bearing assemblies are electrically isolating during operation due to an oil film which is present at the bearing assemblies where they rotate. As the output shaft 124 rotates, electrical charge generates on the output shaft 124. For example, the output shaft 124 can be struck by lightning or other electrical discharges, or can be subjected to triboelectric charge accumulation. Because of the electrically isolating nature of the bearing assemblies, the output shaft 124 can accumulate an electric potential difference vis-à-vis a casing (not shown) of the engine 110. If the electric potential reaches or surpasses the breakdown threshold of the oil film in the bearing assemblies, the accumulated charge can dissipate via dielectric breakdown in the bearing assemblies. This can cause electrical discharge damage (EDD) to the bearing assemblies.

Figure 2:
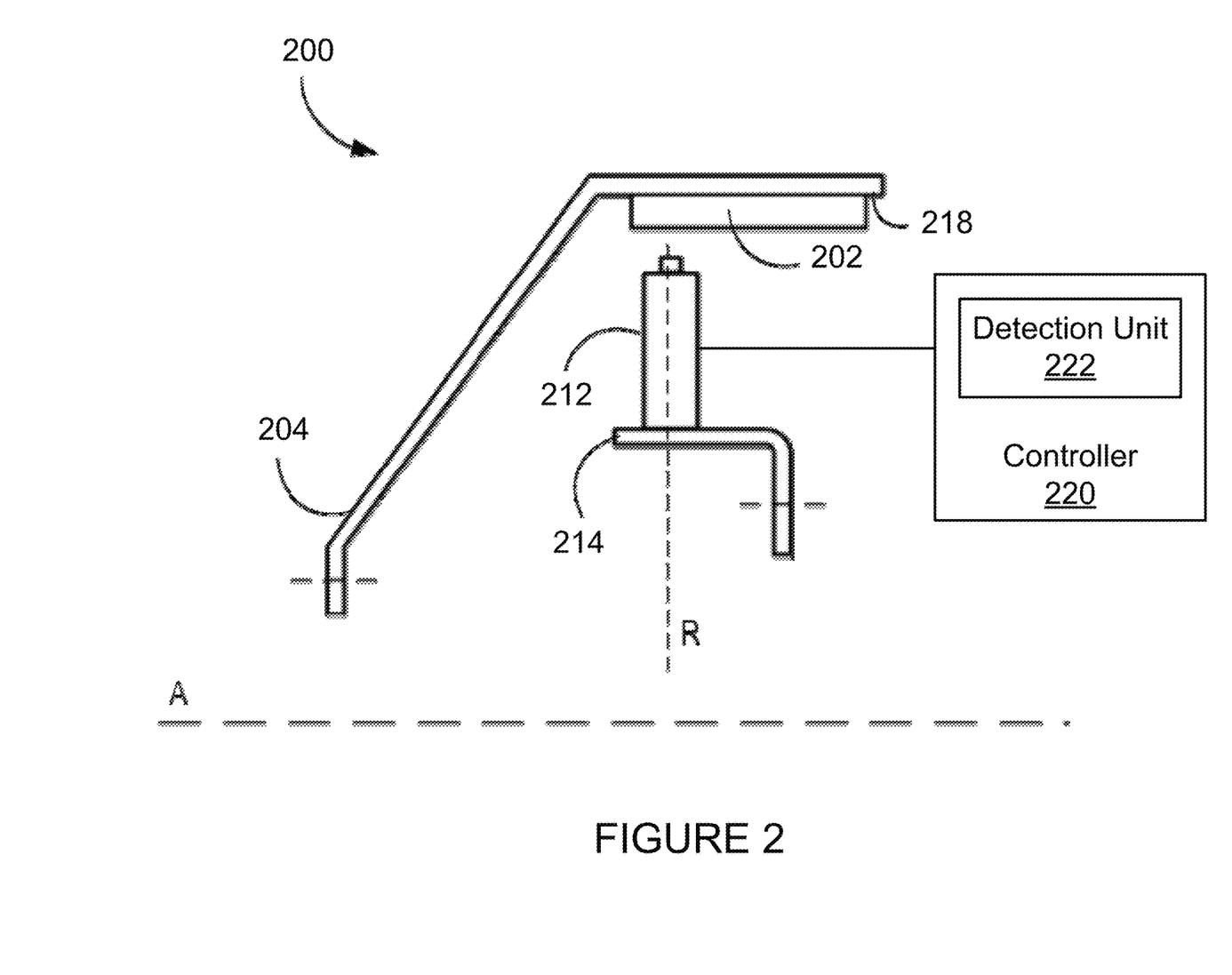
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of detectable features (also referred to as position markers or teeth) 202 disposed thereon for detection by sensor(s) 212. In some embodiments, the feedback device 204 is mounted for rotation with propeller 130 and to move axially with adjustment of the blade angle of the blades of the propeller 130, and the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

The system 200 also includes a controller 220 communicatively coupled to the one or more sensors 212. The sensor(s) 212 are configured for producing a sensor signal which is transmitted to or otherwise received by the controller 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 212 to provide a change in magnetic permeability within the magnetic field generated by the sensor 212.

In the example illustrated in FIG. 2, a side view of a portion of feedback device 204 and sensor 212 is shown. The sensor (or sensors) 212 is mounted to a flange 214 of a housing of the reduction gearbox 126, so as to be positioned adjacent the plurality of position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback device 204 and the position markers 202. In some other embodiments, in order to provide redundancy as well as dual-signal sources at multiple locations, one or more additional sensors, which may be similar to the sensor 212, are provided. For example, an additional sensor 212 may be mounted in a diametrically opposite relationship, or at any angle, relative to the position markers 202, which extend away from the feedback device 204 and towards the sensor(s) 212. In yet another embodiment, several position markers 202 may be spaced equiangularly about the perimeter of the feedback device 204. Other embodiments may apply.

Figure 3:
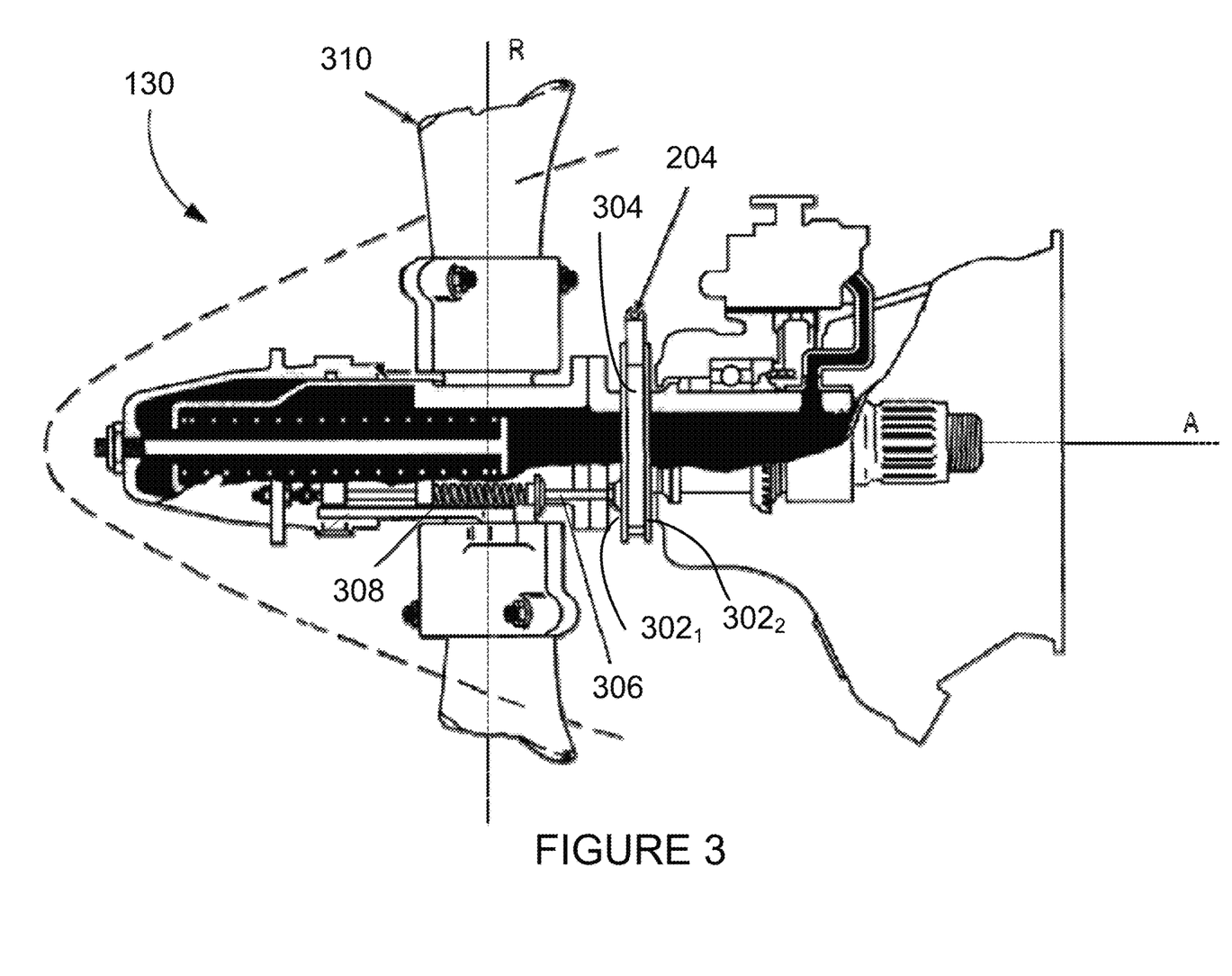
FIG. 3 is a schematic diagram of the propeller of FIG. 1 with the feedback device of FIG. 2, in accordance with an embodiment.

With additional reference to FIG. 3, in some embodiments the feedback device 204 is embodied as a circular disk which rotates as part of the engine 110, for example with the propeller shaft 124 or with the propeller 130. The feedback device 204 comprises opposing faces $301_1$, $301_2$ having outer edges $302_1$, $302_2$ and defines a root surface 304 which extends between the opposing faces $301_1$, $301_2$ and circumscribes them. Put differently, the root surface 304 of the feedback device 204 is the outer periphery of the circular disk which spans between the two opposing faces $301_1$, $302_2$ and the root surface 304 intersects the faces $301_1$, $301_2$ at the edges $302_1$, $302_2$. In these embodiments, the position markers 202 can take the form of projections which extend from the root surface 304.

The position markers 202 may comprise a plurality of first projections (not shown) arranged along a direction substantially transverse to the opposing faces and substantially equally spaced from one another on the root surface 304. The position markers 202 may also comprise one or more second projections (not shown) each positioned between two adjacent first projections. Each second projection is illustratively oriented along a direction, which is at an angle relative to the direction along which the first projections are arranged. The angle can be any suitable value between 1° and 89°, for example 30°, 45°, 60°, or any other value, as appropriate. It should be noted, however, that in some other embodiments the second projection(s) can be co-oriented with the first projections. It should also be noted that in some embodiments, each second projection can be substituted for a groove or inward projection, as appropriate. In addition, in some embodiments, the feedback device 204 includes only a single second projection while, in other embodiments, the feedback device 204 can include more than one second projection. In the latter case, the second projections can be oriented along a common orientation or along one or more different orientations and each second projection can be located at substantially a midpoint between two adjacent first projections or can be located close to a particular one of two adjacent first projections.

In one embodiment, the position markers 202 are integrally formed with the feedback device 204 so that the feedback device 204 may have a unitary construction. In another embodiment, the position markers 202 are manufactured separately from the feedback device 204 and attached thereto using any suitable technique, such as welding or the like.

It should also be noted that, although the present disclosure focuses primarily on embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the circular disk portion of the feedback device 204, such that the feedback device 204 has a substantially smooth or uniform root surface 304. A position marker 202 can then be a portion of the feedback device 204 which is made of a different material, or to which is applied a layer of a different material. The position markers 202 may then be applied to the root surface 304, for instance as strips of metal or other material for detection by the sensor 212, which can be an inductive sensor capable of sensing changes in magnetic flux (as discussed above) or any other suitable sensor such as a Hall sensor or a variable reluctance sensor. Still other embodiments are considered.

The signal pulses produced by the sensor 212, which form part of the electrical signal received by the control system 220, can be used to determine various operating parameters of the engine 110 and the propeller 130. The regular spacing of the first projections can, for example, be used to determine a speed of rotation of the feedback device 204. In addition, the second projection(s) can be detected by the sensor 212 to determine a blade angle of the propeller 130.

With continued reference to FIG. 3, the feedback device 204 is supported for rotation with the propeller 130, which rotates about the longitudinal axis 'A'. The feedback device 204 is also supported for longitudinal sliding movement along the axis A, e.g. by support members, such as a series of circumferentially spaced feedback rods 306 that extend along the axis A. A compression spring 308 surrounds an end portion of each rod 306.

As depicted in FIG. 3, the propeller 130 comprises a plurality of angularly arranged blades 310, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

Figure 4A:
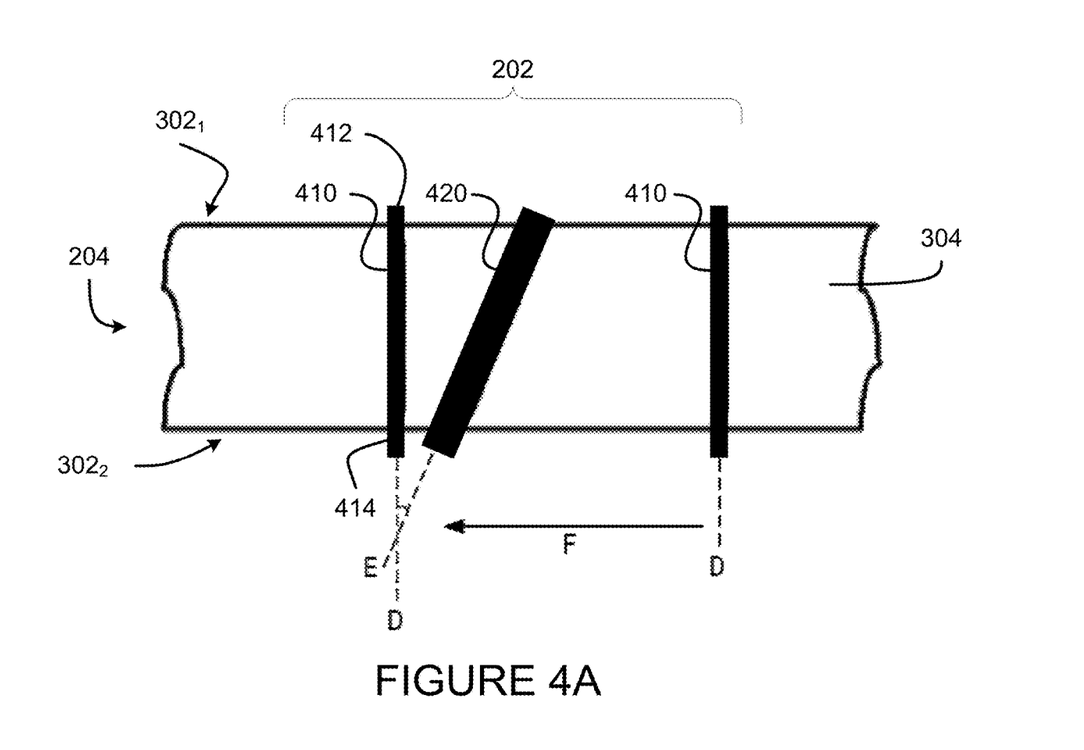
FIGS. 4A and 4B are schematic bottom and side views, respectively, of the feedback device of FIG. 2 with extensions provided on the position markers, in accordance with one embodiment.
Figure 4B:
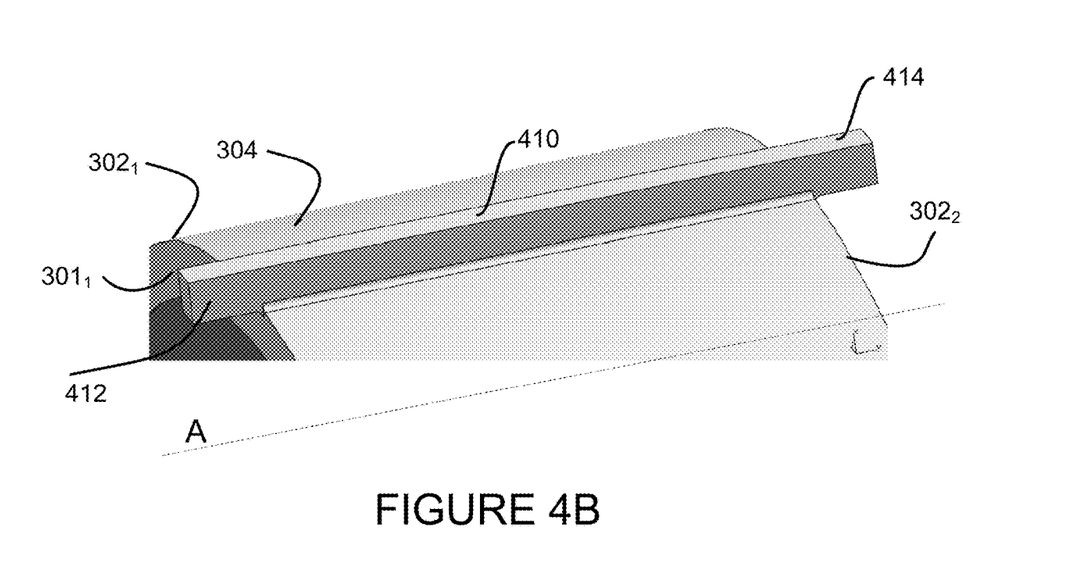

Referring now to FIG. 4A and FIG. 4B, the feedback device 204 illustratively comprises position markers 202, which, in one embodiment, can take the form of projections which extend from the root surface 304. As the feedback device 204 rotates, varying portions thereof enter, pass through, and then exit the sensing zone of the sensor 212. From the perspective of the sensor 212, the feedback device 204 moves axially along axis A and rotates about direction F. However, as the sensor 212 is positioned adjacent to the edges $302_1$, $302_2$ of the feedback device 204 as a result of movement of the feedback device 204, a drop in magnetic flux occurs. This results in a so-called "edge-effect" that leads to an increase in reading error (also referred to herein as beta error) at the edges $302_1$, $302_2$, particularly as the feedback device 204 moves away from the sensor 212. In order to permit the sensor 212 to accurately detect the passage of the position markers 202 without any edge-related effects, it is proposed herein to provide an extension (also referred to herein as an 'extrusion') of material on the position markers 202 in order to axially extend the position markers 202 laterally beyond at least one of the edges $302_1$, $302_2$ of the feedback device 204, as will be discussed further below.

As the extension of material provided on the position markers 202 rotates past the sensor 212, the presence of the added material will make detection possible even when the axial position of the feedback device 204 is farthest away from the sensor 212. In this manner, the magnetic flux path is continuous when the feedback device 204 moves axially away from the sensor 212. In other words, the magnetic flux path is extended and this magnetic path extension provides a low reluctance magnetic return path to close the magnetic circuit. The magnetic path extension further provides a permeable material extension which reroutes the path of the magnetic flux lines and increases the magnetic flux density at the edges of the feedback device 204, as the feedback device 204 moves axially along axis A. This increases the sensor signal and may in turn mitigate (i.e. reduce) edge-related effects, thereby allowing accurate detection of the position markers 202. The material extension illustratively reduces the loss of magnetic flux density at the edges $302_1$ and $302_2$ by essentially moving the at least one of the edges $302_1$, $302_2$ beyond the sensing zone of the sensor 212.

In one embodiment, the extrusion of material is integral with the feedback device 204, whereby the extension is machined from solid, leaving the overhung material extensions. In another embodiment, the material extension is added to the feedback device 204 by welding. Other embodiments may apply that include manufacturing methods such as additive manufacturing, casting, forging, extrusion, powder metallurgy, blanking, broaching, milling, grinding and other suitable methods.

In one embodiment illustrated in FIG. 4A, the position markers 202 include a plurality of projections 410 which are arranged along a direction 'D', which is substantially transverse to the opposing edges $302_1$, $302_2$. Although only two projections 410 are illustrated in FIG. 4A, it should be understood that any suitable number of projections 410 may be present across the whole of the root surface 304. The projections 410 can be substantially equally spaced from one another on the root surface 304. In addition, the projections 410 are of substantially a common shape and size, for example having a common volumetric size. In some embodiments, only some of the projections 410 may have extensions whereas others may not and the projections 410 may not always be equally spaced around the root surface 304.

The feedback device 204 also includes at least one supplementary projection 420 which is positioned between two adjacent ones of the projections 410. In the embodiment depicted in FIG. 4A, the projection 420 is oriented along a direction 'E', which is at an angle relative to direction 'D'. The angle between directions 'D' and 'E' can be any suitable value between 1° and 89°, for example 30°, 45°, 60°, or any other value, as appropriate. It should be noted, however, that in some other embodiments the supplementary projection 420 can be co-oriented with the projections 410, for instance along direction 'D'.

In some embodiments, the feedback device 204 includes only a single supplementary projection 420. In other embodiments, the feedback device 204 can include two, three, four, or more supplementary projections 420. In embodiments in which the feedback device 204 includes more than one supplementary projection 420, the supplementary projections can all be oriented along a common orientation, for instance direction 'E', or can be oriented along one or more different orientations. The projection 420 can be located at substantially a midpoint between two adjacent projections 410, or, as shown in FIG. 4A, can be located close to a particular one of two adjacent projections 410.

In order to reduce any edge-related effects, the projections 410 and 420 are configured to extend laterally (along the direction 'D' and along the direction 'E', respectively) beyond at least one of the edges $302_1$, $302_2$ (i.e. beyond a plane formed by at least one of the faces $301_1$, $301_2$ of the feedback device 204). The position markers 202 illustratively extend laterally beyond the same edge(s) $302_1$, $302_2$. In particular and as shown in FIG. 4B, each projection (as in 410) has a first axial end (also referred to herein as a 'termination' or 'tip') 412 and a second termination 414 (opposite the first termination 412) where the projection terminates in the axial direction relative to rotation axis 'A'.

At least one of the first termination 412 and the second termination 414 is configured to extend beyond a corresponding feedback device edge (i.e. beyond at least one of the edge $302_1$ and the edge $302_2$). For this purpose, an extrusion material may be added to the root surface 304 such that the projections 410, 420 (and particularly the termination 412 and/or the termination 414 thereof) project axially away from the edge $302_1$ and/or the edge $302_2$, along direction 'D' for projections 410 and along direction 'E' for projection 420. The same material as the material of the position markers 202 may be used to create the extrusion and the amount of material to be added may depend on the configuration of the feedback device 204.

In particular, the distance of the terminations 412, 414 (i.e. the distance by which the projections 410, 420 extend away from the edge $302_1$ and/or the edge $302_2$) is illustratively specific to the application, the parameters (e.g. engine configuration) specific to that application, the distance of the sensor 212 relative to the feedback device 204, the geometry of the feedback device 204, and the beta error experienced by the feedback system. In one embodiment, the material is added to the termination 412 and/or the termination 414 such that the projections 410, 420 extend past the sensing zone of the sensor 212. The limiting factors to the extension(s) may relate to stress limitations, therefore, in some embodiments, the extension(s) may be supported by a large radius below the tooth extension, as discussed further below. In another embodiment the terminations extend only as far as required to eliminate the beta error.

It should also be understood that, although the terminations 412, 414 are shown in FIG. 4A as being aligned with the axis of the position markers (e.g. with axis D of position marker 410 and with axis E of position marker 420), all extensions of projections 410 and 420 may terminate in the same plane, substantially parallel to the feedback device face(s) feedback device face(s) $301_1$, $301_2$, as will be discussed further below with reference to FIG. 6A.

Figure 5A:
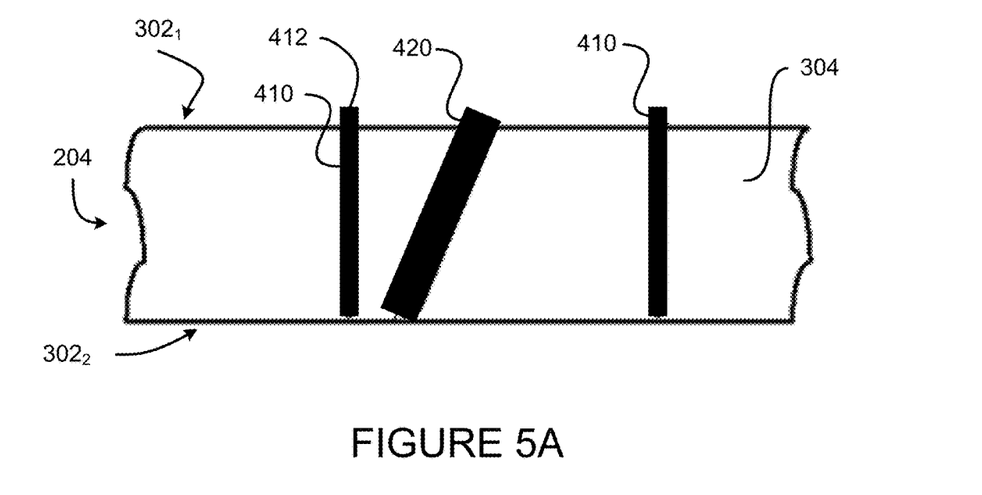
FIGS. 5A and 5B are schematic bottom and side views, respectively, of the feedback device of FIG. 2 with extensions provided on the position markers, in accordance with another embodiment.
Figure 5B:
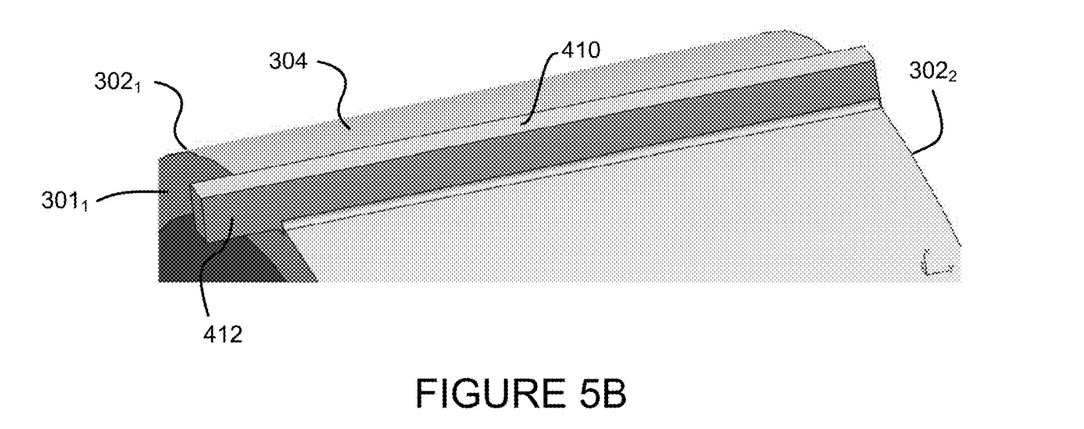

In the embodiment shown in FIG. 4A and FIG. 4B, the projections 410, 420 extend laterally beyond both edges $302_1$ and $302_2$. In particular, the first termination 412 extends laterally beyond the edge $302_1$ and the second termination 414 extends laterally beyond the edge $302_2$. However, it should be understood that the projections 410, 420 may only extend laterally beyond one of the edges $302_1$, $302_2$. For example, and as illustrated in FIG. 5A and FIG. 5B, the first termination 412 may extend beyond the edge $302_1$ while the second termination 414 ends at (i.e. does not extend beyond and is substantially aligned with) the edge $302_2$. Although not illustrated, it should also be understood that the second termination 414 may extend beyond the edge $302_2$ while the first termination 412 ends at (i.e. does not extend beyond and is substantially aligned with) the edge $302_1$.

The determination as to the edge(s) $302_1$, $302_2$ beyond which the projections 410, 420 extend illustratively depends on the location (i.e. the distance) of the sensor 212 relative to the feedback device 204. Indeed, it is desirable to provide the extrusion of material adjacent the edge(s) $302_1$, $302_2$ furthest away from a location where the sensor 212 is positioned. For example, for a feedback device assembly having a sensor 212 located adjacent a given one of the edges (e.g., edge $302_1$), it may be desirable to extend the projections 410, 420 beyond the opposite edge (e.g., edge $302_2$. If the sensor 212 is positioned between the edges $302_1$, $302_2$, e.g., substantially halfway, it may in turn be desirable to extend the projections 410, 420 beyond both edges $302_1$, $302_2$. Additional factors, such as the amount of beta error, may also come into play when determining the edge(s) $302_1$, $302_2$ beyond which the projections 410, 420 extend. For example, if a higher beta error is exhibited on one side of the feedback device 204, material extension may be added to balance the readings or eliminate the beta error all together. Available space according to clearances and tolerance stackup of the feedback system may also impact the determination as to which edge $302_1$, $302_2$ to extend. Additionally, the determination of which edge $302_1$, $302_2$ to extend may be related to the accuracy required by the feedback system and the extension may be employed as a means of achieving the required accuracy.

Figure 6A:
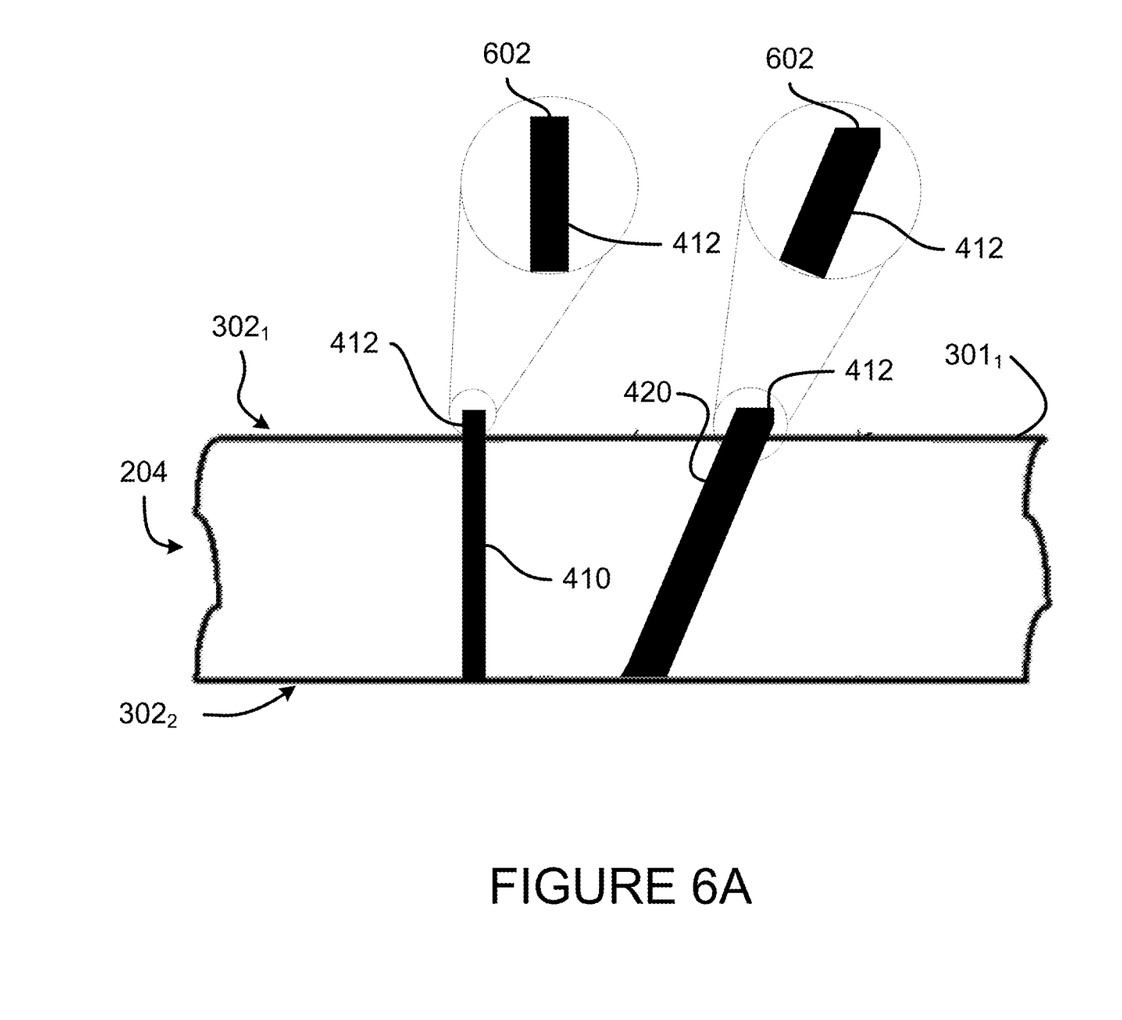
FIG. 6A is a schematic bottom view of the feedback device of FIG. 2 showing the shape of position marker terminations, in accordance with one embodiment.
Figure 6B:
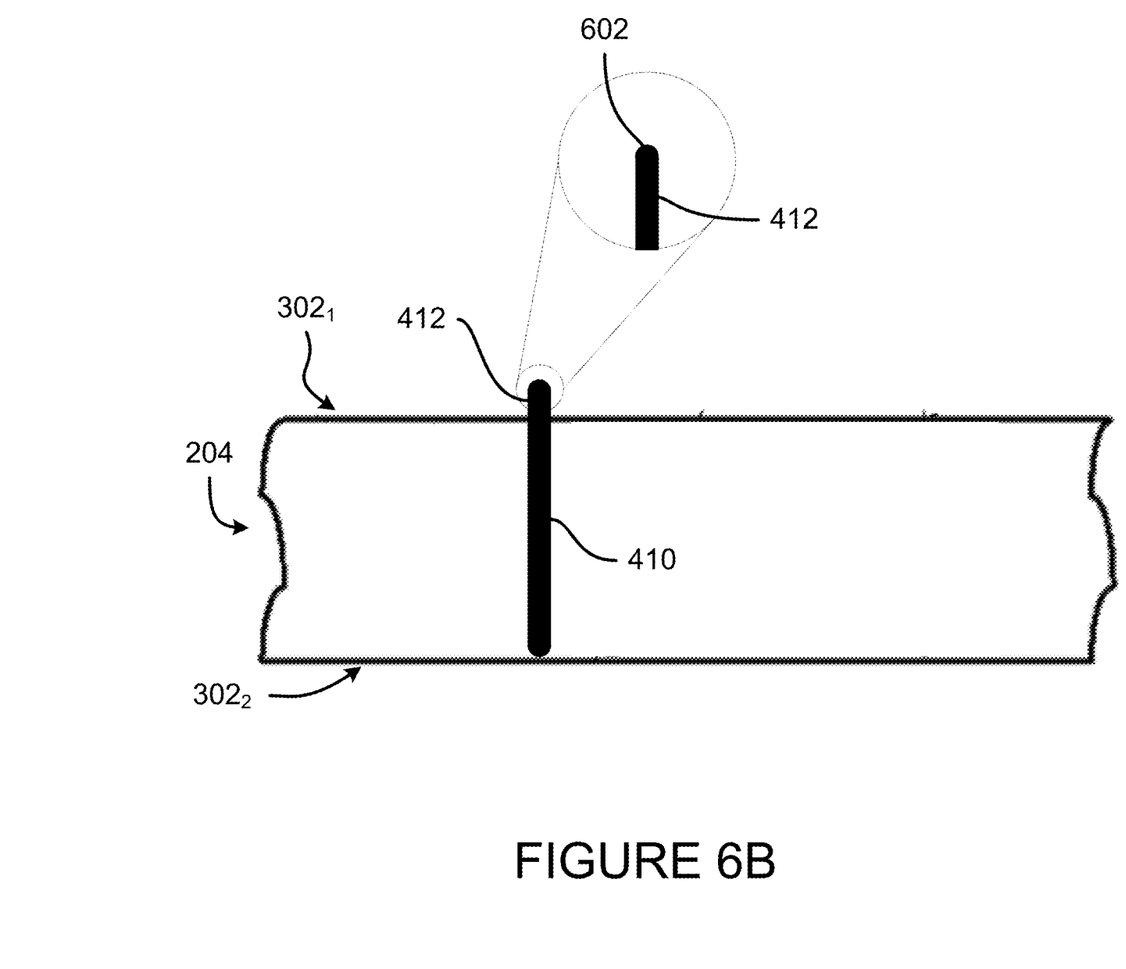
FIG. 6B is a schematic bottom view of the feedback device of FIG. 2 showing the shape of position marker terminations, in accordance with another embodiment.

In addition and as shown in FIG. 6A and FIG. 6B, it should be understood that the extrusion of material may be provided on the position markers 202 to achieve terminations 412, 414 of various shapes. For instance, in one embodiment illustrated in FIG. 6A, the position marker termination(s) (e.g., termination 412) may have an edge 602 which extends along a plane (not shown) that is substantially parallel to the plane formed by the feedback device face(s) (e.g., face $301_1$) that the position marker(s) (e.g., projections 410, 420) extend beyond. In another embodiment illustrated in FIG. 6B, the position markers (e.g., projection 410) have termination(s) (e.g., termination 412) with rounded edges as in 602. Other embodiments may apply.

Figure 7:
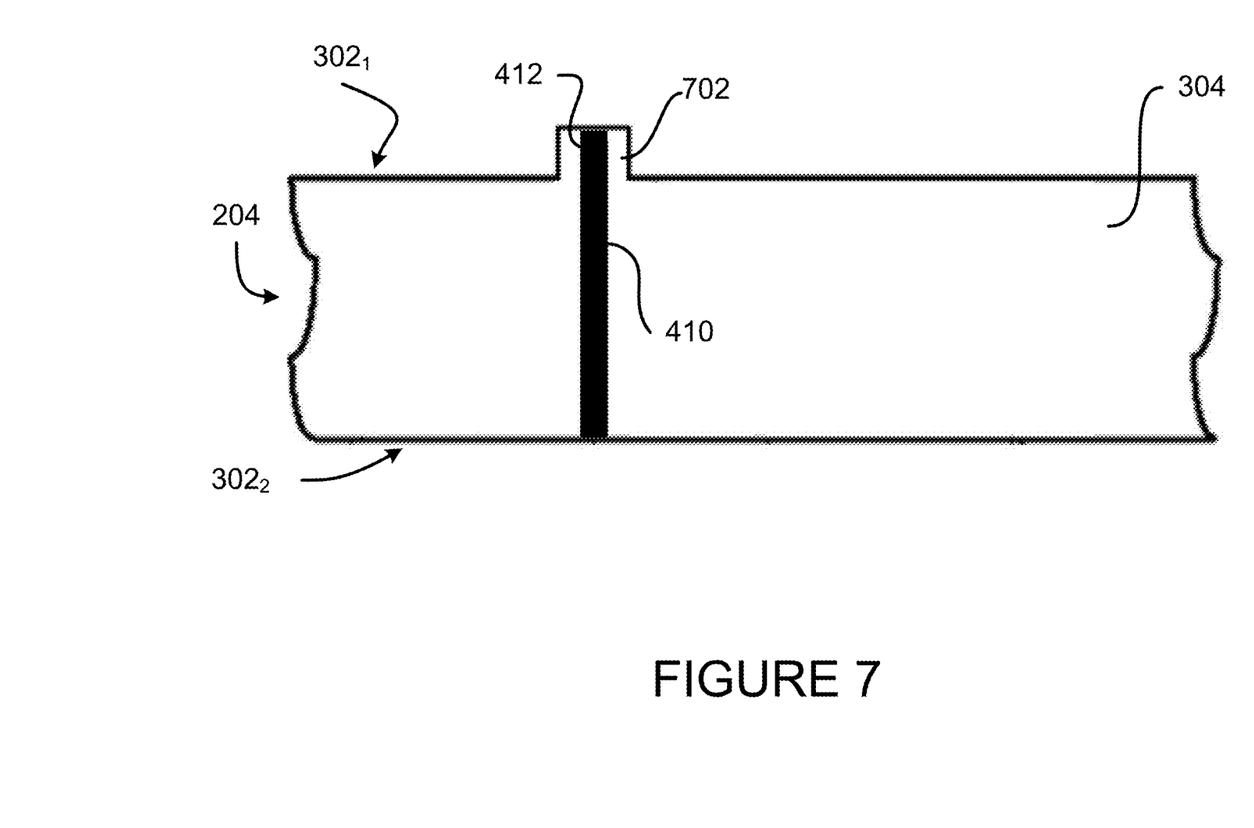
FIG. 7 is a schematic bottom view of the feedback device of FIG. 2 showing an extension of the root surface of the feedback device, in accordance with yet another embodiment.

In some embodiments, the base material of the feedback device 204 may also be extended beyond the edge $302_1$ and/or the edge $302_2$ in order to provide support for the extrusion of material that extends the projections 410, 420 beyond the edge $302_1$ and/or the edge $302_2$. For example, and as shown in FIG. 7, the root surface 304 may be extended axially (along the longitudinal direction of the projections 410, 420) away from and beyond the edge $302_1$, thereby forming a support member (also referred to herein as a rib or large radius) 702 for stiffening the termination 412 as the feedback device 204 rotates. The dimensions of the support member 702 may vary depending on configurations but it should be understood that it is desirable for the support member 702 to extend laterally away from the edge $302_1$ and/or the edge $302_2$ up to the edge (reference 602 in FIG. 6A) of the termination 412, 414. It should also be understood that the support member 702 may span part or the entirety of the circumference of the feedback device 204. Although the support member 702 is illustrated in FIG. 7 as comprising an individual rib or radius provided at the location of each extension, the support member 702 may alternatively be provided as a singular support provided at a suitable distance from the sensor 212.

From the above description, it can be seen that, in one embodiment, the feedback device 204 may be configured to allowing for the sensor 212 to be positioned near or at the edges $302_1$, $302_2$ of the feedback device 204 while accurately detecting the passage of the position markers 202, thereby mitigating any edge-related effects that may influence the sensor 212.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback assembly comprising:
an aircraft-bladed rotor, the rotor rotatable about a longitudinal axis and having an adjustable blade pitch angle, the blade angle feedback assembly further comprising:
a feedback device coupled to rotate with the rotor, the feedback device having a root surface having an edge;
at least one position marker extending from the root surface and extending laterally beyond the edge; and
at least one sensor mounted adjacent the feedback device and configured to detect a passage of the at least one position marker as the feedback device rotates about the longitudinal axis.

2. The feedback assembly of claim 1, wherein the root surface has a first edge and a second edge opposite the first edge, and the at least one position marker extends axially from a first end to a second end, at least one of the first end and the second end extending laterally beyond a corresponding at least one of the first edge and the second edge.

3. The feedback assembly of claim 2, wherein the at least one sensor is configured to detect, as the feedback device rotates about the longitudinal axis, a change in magnetic flux caused by passage of the at least one position marker in a sensing zone of the at least one sensor, the at least one of the first end and the second end extending laterally beyond the at least one of the first edge and the second edge resulting in an increase in a density of the magnetic flux as the feedback device is displaced along the longitudinal axis.

4. The feedback assembly of claim 3, wherein the at least one sensor is mounted adjacent the feedback device between the first edge and the second edge, the first end of the at least one position marker extending laterally beyond the first edge and the second end of the at least one position marker extending laterally beyond the second edge.

5. The feedback assembly of claim 3, wherein the at least one sensor is mounted adjacent a given one of the first edge and the second edge, the at least one position marker extending laterally beyond the other one of the first edge and the second edge.

6. The feedback assembly of claim 2, wherein the feedback device comprises at least one support member configured to extend away from the at least one of the first edge and the second edge and to support the at least one of the first end and the second end thereon.

7. The feedback assembly of claim 2, wherein the at least one of the first end and the second end is substantially parallel to the corresponding at least one of the first edge and the second edge.

8. The feedback assembly of claim 1, wherein the at least one position marker comprises a first plurality of projections extending from the root surface and oriented substantially parallel to the longitudinal axis and at least one second projection extending from the root surface and positioned between two adjacent first projections, the first plurality of projections circumferentially spaced from one another and the at least one second projection disposed on the root surface at an oblique angle relative to the first plurality of projections, and further wherein the first plurality of projections and the at least one second projection extend laterally beyond the at least one of the first edge and the second edge.

9. An aircraft-bladed rotor system, comprising:
a rotor rotatable by a shaft about a longitudinal axis, the rotor having blades with adjustable blade pitch angle; and
a feedback device coupled to rotate with the rotor, the feedback device having a root surface having an edge, at least one position marker extending from the root surface and extending laterally beyond the edge.

10. The system of claim 9, wherein the root surface has a first edge and a second edge opposite the first edge, and the at least one position marker extends axially along the root surface from a first end to a second end, at least one of the first end and the second end extending laterally beyond a corresponding at least one of the first edge and the second edge.

11. The system of claim 10, further comprising at least one sensor mounted adjacent the feedback device, the at least one sensor configured to detect, as the feedback device rotates about the longitudinal axis, a change in magnetic flux caused by passage of the at least one position marker in a sensing zone of the at least one sensor, the at least one of the first end and the second end extending laterally beyond the at least one of the first edge and the second edge resulting in an increase in a density of the magnetic flux as the feedback device is displaced along the longitudinal axis.

12. The system of claim 11, wherein the at least one sensor is mounted adjacent the feedback device between the first edge and the second edge, the first end of the at least one position marker extending laterally beyond the first edge and the second end of the at least one position marker extending laterally beyond the second edge.

13. The system of claim 11, wherein the at least one sensor is mounted adjacent a given one of the first edge and the second edge, the at least one position marker extending laterally beyond the other one of the first edge and the second edge.

14. The system of claim 10, wherein the feedback device comprises at least one support member configured to extend away from the at least one of the first edge and the second edge and to support the at least one of the first end and the second end thereon.

15. The system of claim 10, wherein the at least one of the first end and the second end is substantially parallel to the corresponding at least one of the first edge and the second edge.

16. The system of claim 9, wherein the at least one position marker comprises a first plurality of projections extending from the root surface and oriented substantially parallel to the longitudinal axis and at least one second projection extending from the root surface and positioned between two adjacent first projections, the first plurality of projections circumferentially spaced from one another and the at least one second projection disposed on the root surface at an angle relative to the first plurality of projections, and further wherein the first plurality of projections and the at least one second projection extend laterally beyond the at least one of the first edge and the second edge.

* * * * *